_United States Patent_ [19]

Parkin

[11] 3,875,402

[45] Apr. 1, 1975

[54] PHOTOSENSITIVE TRACKING DEVICE WITH A.C. READOUT OF POSITION OF IMAGE ON SPECIAL PHOTOCELL

[75] Inventor: William J. Parkin, Natick, Mass.

[73] Assignee: Massachusetts Institute of Technology, Cambridge, Mass.

[22] Filed: Jan. 23, 1963

[21] Appl. No.: 253,503

[52] U.S. Cl.......... 250/203 R, 250/211 R, 250/338, 244/3.16
[51] Int. Cl............................................. G01j 1/20
[58] Field of Search.... 250/338, 202, 203 R, 211 R; 356/152; 313/94; 244/3.16

[56] References Cited
UNITED STATES PATENTS

| | | | |
|---|---|---|---|
| 2,861,262 | 8/1955 | Pankove | 250/211 R |
| 2,877,284 | 3/1959 | Schultz | 136/89 |
| 2,959,681 | 11/1960 | Noyce | 250/211 R |
| 2,976,758 | 3/1961 | Parker | 250/203 R |
| 3,028,500 | 4/1962 | Wallmark | 250/203 R |
| 3,032,660 | 5/1962 | Kim | 250/338 |
| 3,033,073 | 5/1962 | Shuttleworth | 313/94 X |
| 3,038,079 | 6/1962 | Mueller | 250/203 R |

_Primary Examiner_—Maynard R. Wilbur
_Assistant Examiner_—S. C. Buczinski
_Attorney, Agent, or Firm_—Robert J. Horn, Jr.; Melvin R. Jenney

EXEMPLARY CLAIM

1. Radiant energy sensing apparatus comprising:
    a radiant energy responsive photoconductive element having a surface,
    a plurality of electrical contacts making electrical ohmic connection with said element in mutually spaced relation on said element,
    a plurality of out-of-phase sources of alternating current each of said plurality of sources being simultaneously connected to and energizing a different pair of said contacts, said pairs of contacts being oriented along non-parallel lines in relation to each other,
    a sensing contact being one of said plurality of contacts, said sensing contact being disposed within the region bounded by the contacts of said pairs,
    an output terminal connected to said sensing contact to provide a plurality of out-of-phase continuous output signals of alternating current,
    means for separating said plurality of continuous output signals to provide a separate continuous output signal corresponding to each out-of-phase source, the phase and amplitude of each separate output signal relative its corresponding source being indicative of the position of impinging radiant energy on the surface of said element.

7 Claims, 7 Drawing Figures

INVENTOR.
WILLIAM J. PARKIN
BY Robert J. Horn, Jr.
ATTORNEY

INVENTOR.
WILLIAM J. PARKIN

PHOTOSENSITIVE TRACKING DEVICE WITH A.C. READOUT OF POSITION OF IMAGE ON SPECIAL PHOTOCELL

This invention relates to radiant energy sensing apparatus and in particular to an infrared detector for detecting and locating the position of a remote source of infrared radiation.

Photoconductive and photovoltaic materials have been used in the prior art in various devices for detecting the presence and location of a source of radiant energy. Radiant energy sensitive devices employing photoconductive materials have been used in position-indicating applications by the technique of employing a rotating reticle between the photoconductive element, or detector cell, and the source of radiant energy. Absent the reticle, the photoconductive element connected to a source of voltage through a resistor has across its terminals the same output voltage regardless of the locus of the beam or spot of radiant energy on the surface of the element. The rotating reticle has coded aperture configurations which vary according to the radial distance from the center of rotation. Thus, a different coded signal is obtained from the photoconductive circuit depending upon the particular coded aperture configuration which intercepts the beam of radiant energy from the source. The mechanically rotating reticle system in conjunction with a photoconductive device has been found to have limited usefulness in applications where the source of radiant energy is modulated, intermittent, or of short duration, and to be subject to mechanical failure.

Another prior art radiant energy detector employs a photovoltaic type material such as described in an article by J. T. Wallmark, Proc. Inst. Radar Engr. 45, 474–483 (1957). A voltage is generated in a localized region of such material by a concentrated source of radiant energy. The output voltage decays with increasing distance between the output terminal making ohmic contact with the surface of the material and the locus of the beam or spot at which the voltage is generated. This phenomenon has been utilized in an infrared energy spot position indicator by providing a photovoltaic material with four spaced terminals. Typically, these terminals are located at the corners of a square with the voltage difference between terminals at opposite corners indicative of the position of the spot along the diagonals of the square. This type of photovoltaic device generates a direct current signal at its terminal which can be modulated before amplification by the use of a chopper circuit or with a rotating reticle. The low amplitude of output signal and the necessity for modulating the direct current signal limits the usefulness of this device.

It is, therefore, an object of this invention to provide an improved radiant energy sensing device for determining the presence and location of a remote source of radiant energy.

More specifically, it is an object of the present invention to provide a radiant energy sensing device wherein the position of a spot or beam of radiant energy impinging on the surface of the sensitive material may be determined electrically without the use of a rotating reticle or other mechanical means.

It is likewise an object of the invention to provide an improved tracking system for determining the location of a remote source of radiant energy, utilizing said device as the position-responsive sensor.

In accordance with these and other objects, the present invention involves the provision of a sensing device for radiant energy wherein the radiant energy sensitive material, occupying an area relatively large in comparison with the size of the spot or beam of radiant energy normally impinging on the sensitive layer, is provided with a plurality of mutually spaced connections to the layer, with some connections receiving excitation to establish potential gradients in one or more directions along the layer. Other connections permit signals to be derived from the device indicative of the position of the impinging spot or beam of radiation on the sensitive material.

In a preferred form of the invention, the energizing means is a two-phase voltage source in phase quadrature. Each phase is connected to diagonally opposed pairs of terminals arranged as the four corners of a square on the surface of a photoconductive material. A sensing terminal located at the center of the square is connected to a phase sensitive circuit which separates the quadrature voltage components which exist at the sensing terminal. The magnitude and polarity of the quadrature components determine the location on the material of the impinging spot of radiant energy.

The improved sensing device of the invention may be effectively embodied in tracking systems for determining the location of a remote source of radiant energy. The output signals from the device may be utilized as azimuth and elevation drive signals to position a movable mount so that the impinging radiant energy falls on the null point of the material.

Other objects of the invention will be apparent from the detailed description and the accompanying drawings in which.

Figure 1:
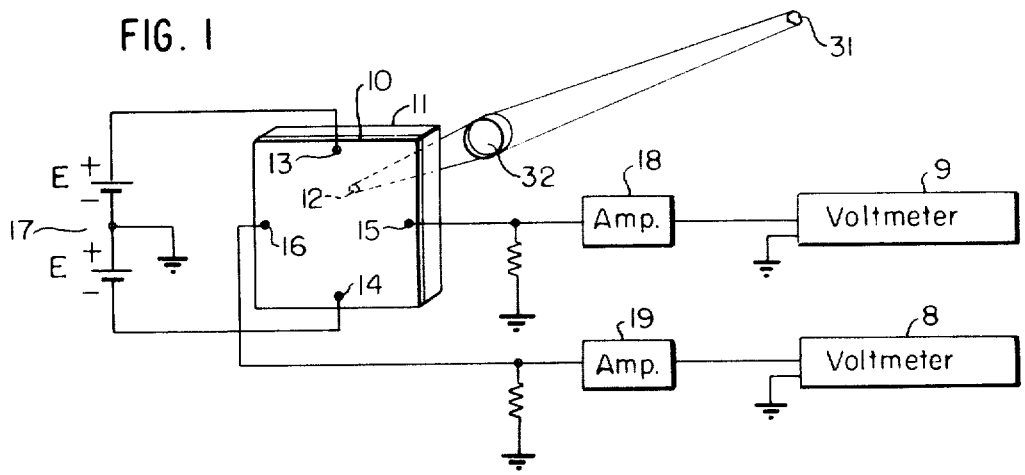
FIG. 1 is a diagrammatic showing of the radiant energy sensing device of the present invention, shown in conjunction with simplified circuit means for deriving positional information in one dimension of the device.

Referring to FIG. 1, a sensing apparatus employing a lead sulphide photoconductive detector element 10 deposited on a quartz surface 11 is connected in such a way that its output depends upon the location of the target image 12 on the surface of element 10. The element 10 has four ohmic electrical contacts or terminals, 13, 14, 15 and 16, in quadrilateral arrangement. A source of direct voltage 17 center-tapped to ground is connected to two diagonally opposed terminals 13, 14. Output amplifiers 18, 19 are connected to the output terminals 15, 16, respectively. Preferably, terminals 15, 16 are located approximately midway between the energizing terminals 13, 14. A concentration of radiant energy from a remote source 31 by a lens system 32 results in a spot or image 12 impinging on the surface of the element 10 to cause a change in the resistivity of the element 10 in the region of image 12. When there is no impinging radiation on the surface of the element 10, there exist equipotential lines of the shape shown in FIG. 2. Line 22 represents the maximum voltage gradient path between terminals 13 and 14. If terminals 15, 16 are located on the zero-voltage equipotential line 21, no voltage will exist relative to ground at these terminals and, therefore, the outputs of amplifiers 18 and 19 will be zero and indicated on voltmeters 9 and 10, respectively. When the radiant energy of target image 12 impinges on the element 10, the localized change in resistivity causes the equipotential lines to become deformed and shift position, as shown in FIG. 3. It is seen that the location of zero equipotential line 21 of FIG. 2 has been shifted in FIG. 3. It is observed that terminals 15 and 16 are no longer on the zero equipotential line 21, and therefore, a voltage exists at these terminals, as measured on voltmeters 8 and 9, which is indicative of the location of target image 12. As shown in FIG. 3, target image 12 is located closer to terminal 15 than to terminal 16, and therefore the deformation of the equipotential lines will be greater in the vicinity of terminal 15. Consequently, a greater voltage output will exist at terminal 15 than at terminal 16. For the target image position 12 shown in FIG. 3 it is assumed that the output voltage at terminals 15 and 16 is positive. If the target image 12 were located at the corresponding image position below equipotential line 21, the polarity of the voltage at terminals 15 and 16 would be negative. Thus, it is seen that the position of the target image 12 above or below terminals 15 and 16 may be determined by the polarity of the output voltage from terminals 15 or 16. In addition, the disturbance produced by target image 12 on the equipotential lines will depend upon its location. The nearer target image 12 is located to the power input terminals 13, 14, the greater will be the output voltage. Also, the magnitude of the output voltage at terminals 15, 16 will depend upon the intensity of the target image 12. The greater the intensity the greater the output voltage.

Figure 2:
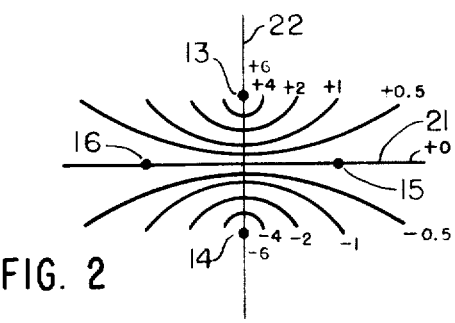
FIG. 2 represents the equipotential lines of the photoconductive element of FIG. 1 when there is no radiant energy impinging on the surface of the element.
Figure 3:
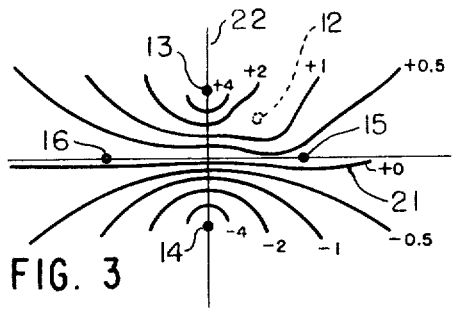
FIG. 3 represents the distortion of the equipotential lines of FIG. 2 as a result of impinging radiant energy.

Terminals 15, 16 have been described as being located on the zero equipotential line 21 of FIG. 2. However, it is not necessary that they be accurately located on this equipotential line since any residual output voltage resulting from non-uniformity of the detector material 10 or from inaccurate positioning of the contact points 15, 16 may be balanced out by internal balancing controls in d.c. amplifiers 18, 19. Residual d.c. voltage output which results from terminals 15, 16 not being placed exactly on the zero potential line 21 may also be eliminated by the use of amplifiers 18, 19 of the alternating current type, which will block out the residual d.c. voltage at their inputs. In this case the circuit of FIG. 1 would be useful for the purpose of detecting changes in position of the target image 12 but not for determining its absolute location since no output signal would be obtained through the a.c. amplifier when the target image 12 was stationary on the element 10. Conventional chopping techiques may be employed to give a signal under this condition.

Various modifications of the circuit of FIG. 1 may be made if desired. In particular, terminal 16 may be eliminated entirely and positional information on target image 12 obtained at terminal 15. However, depending upon target image location 12 the output from terminal 16 may exceed the output from terminal 15. Therefore, if terminal 16 is eliminated some loss of sensitivity may be expected. Terminal 15 may be located midway on a line between terminals 13 and 14, as in FIG. 5 terminal 51, to obtain equal sensitivity to target image positions 12 to the right or left of terminal 15. Alternately, terminal 16 may be grounded, although this condition does not appear advantageous over the case where terminal 16 is ungrounded or omitted entirely.

Figure 4:
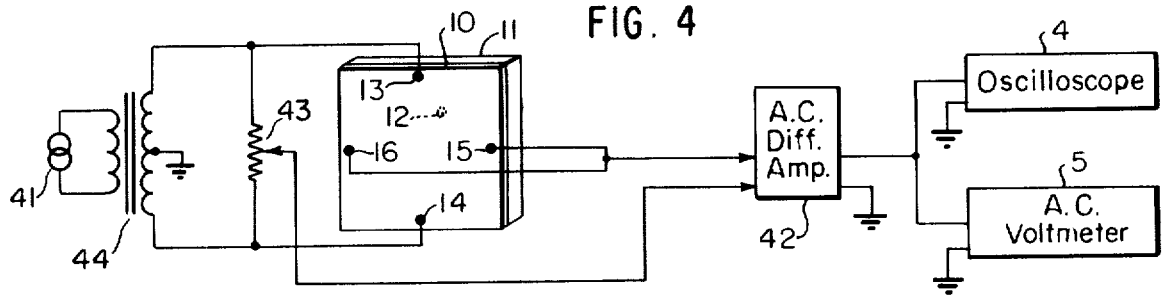
FIG. 4 illustrates a single-coordinate system utilizing alternating current for excitation.

FIG. 4 shows an alternating current power source 41 driving a grounded-center-tapped transformer 44 to obtain a push-pull balanced voltage drive on photoconductive cell 10. The equipotential lines of FIG. 2 apply where the potential applied to terminals 13, 14 is alternating as well as direct. Minor modifications of FIG. 1 are made. In particular, output terminals 15, 16 located approximately mid-way between terminals 13 and 14 are tied together and are used as one input to an alternating current differential amplifier 42. Tying these terminals together averages the individual output voltage of the individual terminals 15 and 16. The other terminal of the a.c. differential amplifier 42 is connected to a null balancing potentiometer 43. Potentiometer 43 is adjusted to produce a zero output from the differential amplifier 42 to oscilloscope 4 and voltmeter 5 when there is no target image 12 impinging on surface 10. The null balancing potentiometer 43 is necessary because output terminals 15, 16 will not generally fall on the zero potential line 21.

The a.c. output voltage from differential amplifier 42 depends in magnitude and phase upon the location of target image 12 and in particular undergoes at 180° phase reversal as target image 12 crosses the imaginary line joining terminals 15 and 16. The output amplitude increases as target image 12 approaches terminals 13, 14. As in the direct current energization case of FIG. 1, terminals 15, 16 can be connected to separate differential amplifiers or one of the terminals may be eliminated altogether.

Figure 5:
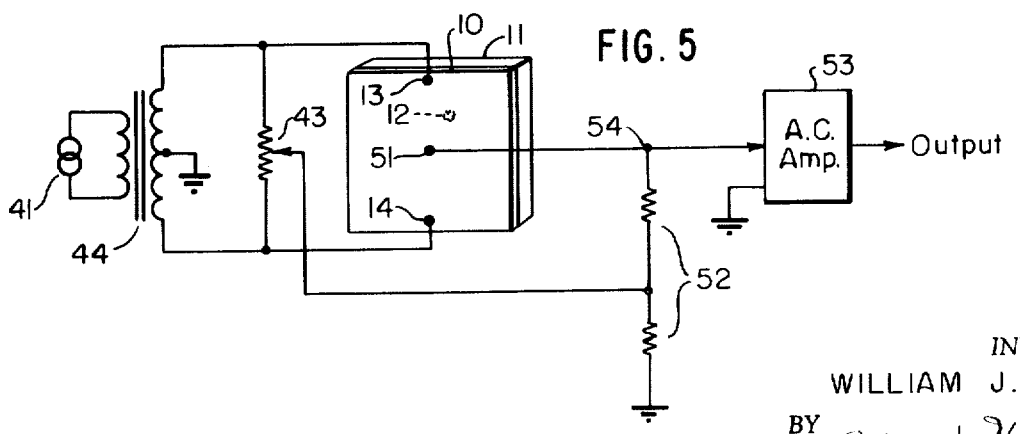
FIG. 5 illustrates an alternative embodiment utilizing a three-terminal photoconductive device.

FIG. 5 shows a modified version of the alternating current position sensing device of FIG. 4. In FIG. 5 an independent contact 51 is centrally located between energization terminals 13 and 14 and serves as the sensing terminal for determining the position of image 12. In the event sensing contact 51 is not located on the zero potential line 21, potentiometer 43 is, in the absence of a target image 12, adjusted to secure a zero amplitude signal at terminal 54 of summing circuit 52. Alternating current amplifier 53 is a conventional amplifier connected to terminal 51 to provide a relatively low impedance output. When target image 12 impinges on the surface of element 10 an alternating current appears at the output of amplifier 53 whose magnitude and phase depends upon the vertical location of image 12 relative to contact 51.

Figure 6:
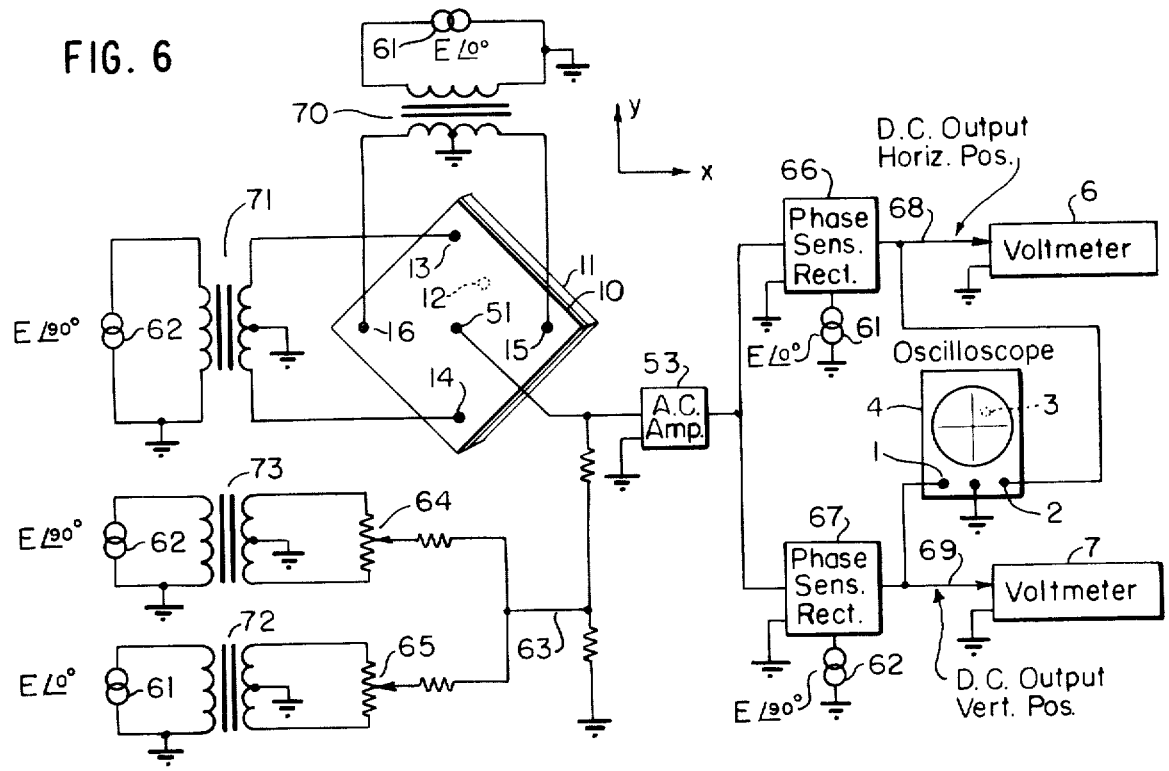
FIG. 6 illustrates a further modification wherein positional information in two coordinates may be derived.

FIG. 6 is a modification of the circuit of FIG. 5 wherein the detector element 10 has been adapted to provide the X (horizontal) and Y (vertical) location of the target image 12 relative to sensing terminal 51. Contacts 15, 16 are connected through energizing means comprising center-tapped transformer 70 and a source of alternating current 61 whose phase is arbitrarily assumed to be zero degrees. Terminals 13, 14 are connected through energizing means comprising center-tapped transformer 71 and another source of alternating current 62 which is 90° out of phase with the voltage source 61. The equipotential lines and maximum voltage gradient paths of the a.c. energizing signals established by sources 61 and 62 are orthogonal in the plane of cell 10. The combination of excitation by sources in phase quadrature in time and space produces a rotating electric field in cell 10.

With no target image 12 on element 10, contact 51 is desirably at the zero equipotential line for both sources 61 and 62. However, any residual signal appearing at terminal 51 is cancelled at the input of a.c. amplifier 53 by the null balancing circuit 63. The residual signal which appears at terminal 51 prior to being balanced out appears at the outputs 68, 69 of output means comprising amplifier 53 and phase sensitive rectifiers 66, 67. Phase sensitive rectifier 66 has as its reference input the zero phase voltage 61. A phase sensitive rectifier has the characteristic that only those input signals in phase or 180° out of phase with its reference voltage will appear at the output as a direct current signal. The polarity of the output signal is determined by the phase relationship of the input signal and the reference voltage. Therefore, in the absence of target image 12, if a d.c. voltage appears at output 68 of phase sensitive rectifier 66, it is the result of terminal 51 being displaced in the X-direction from the zero potential line of energized terminals 15 and 16.

The d.c. voltage appearing at output 68 and indicated by meter 6 is made to become zero by adjustment of balancing means comprising center-tapped transformer 72, source 61, and potentiometer 65 of null balancing circuit 63 which introduces a zero phase voltage equal and opposite to the residual zero phase voltage at terminal 51. Similarly, a residual d.c. voltage appearing at output 69 is caused by a displacement of terminal 51 in the Y-direction from the zero equipotential line produced by the terminals 13 and 14 when excited from voltage source 62. Adjustment of potentiometer 64 of said balancing means including transformer 73 and source 62 operates to balance out the 90° component of residual voltage at terminal 51. Potentiometer 64 is adjusted until the d.c. voltage at terminal 69 is zero. The balancing procedure has established a null point coincident with terminal 51 in the absence of impinging radiation on element 10.

Since output terminal 51 is a null point, radiation focussed upon terminal 51 as a target image 12 will not produce an output signal. However, if target image 12 is displaced in the x- and y-directions from terminal 51, the change in conductivity of the photoconductive material 10 at the point of impingement of target image 12 will cause terminal 51 to be located no longer at the null point. The reference phase component of voltage at terminal 51 will be produced by the distortion of the reference phase equipotential lines in element 10 caused by the localized change in conductivity. The amplitude and phase of this reference phase voltage component at terminal 51 determines a first locus of possible points of impingement of target image 12. Similarly, the x and y displacement of target image 12 will cause a quadrature phase voltage component at terminal 51 whose amplitude and phase determine a second locus of possible points of impingement of target image 12. The point of intersection of the first and second loci of points establishes the x and y position of the target image 12. In the circuit of FIG. 6, the amplitude and polarity of the reference phase voltage component at terminal 51 is available as a direct current signal output 68 from phase sensitive rectifier 66, one of whose inputs is reference phase voltage source 61. The polarity and amplitude of the signal at output 68, therefore, also determines said first locus. Similarly, the amplitude and polarity of the orthogonal phase component of voltage at terminal 51 is available at the output 69 of phase sensitive rectifier 67 as a direct current signal establishing said second locus. The point of intersection of the first and the second locus, hence target image 12 position, is approximately obtained by connecting an oscilloscope 4 to the outputs of phase sensitive rectifiers 66, 67. The oscilloscope horizontal input terminal 2 is connected to horizontal position voltage output 68 while oscilloscope vertical input terminal 1 is connected to vertical position voltage output 69. The light spot 3 on the cathode ray tube face of oscilloscope 4 will represent only the approximate position of target image 12 on element 10, since the output voltage is a function of the intensity of radiant energy as well as position.

Referring to FIG. 6, the input voltages to terminals 15, 16 and terminals 13, 14 are shown as being supplied from a grounded center-tapped transformer 70 and 71. This arrangement causes the potential of centrally positioned terminal 51 to be very near ground potential. The center-tapped transformer circuit is preferred since null balancing to provide zero output signal at terminal 51 in the absence of impinging radiation results in a condition where phase reversal of an output voltage component occurs when impinging radiation crosses either the x or y coordinate lines whose origin is at terminal 51. The balancing circuit 62 is shown as being connected to sources 61 and 62 through separate transformers 72 and 73.

Figure 7:
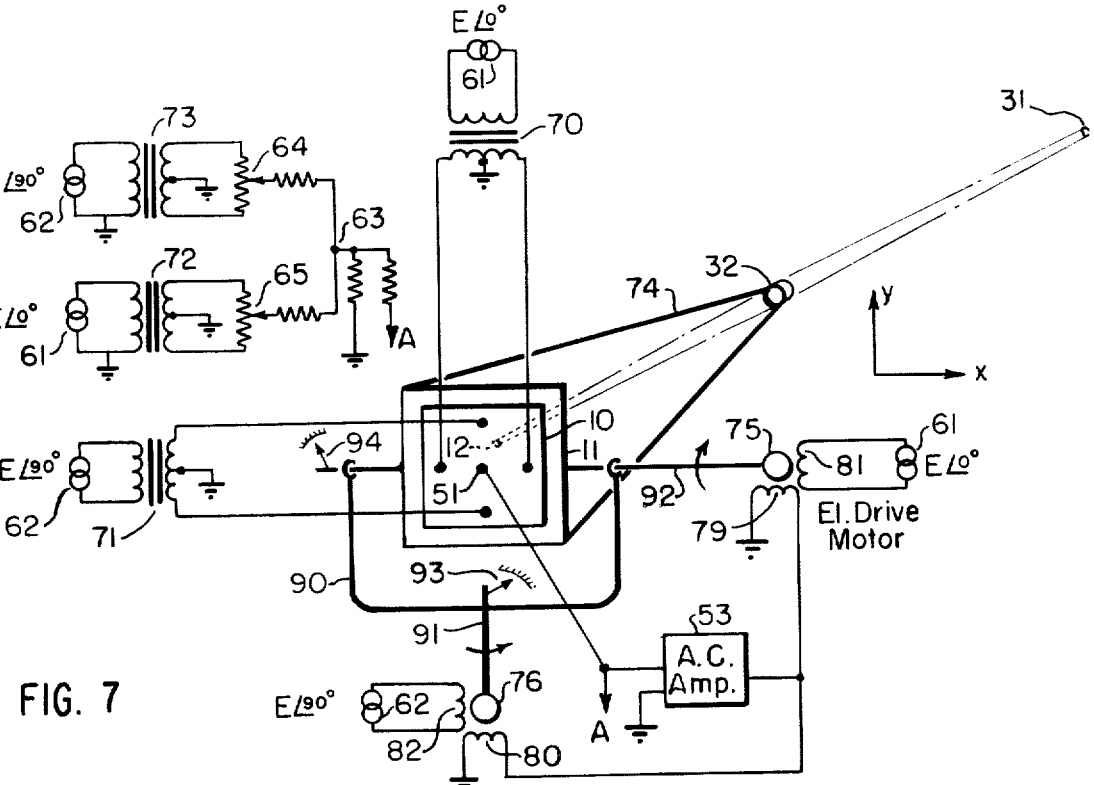
FIG. 7 illustrates a servo-type tracking system utilizing the position-responsive radiant energy sensor of the present invention.

FIG. 7 is an illustration of a target tracking apparatus embodying the present invention. The tracker utilizes a carriage means for positioning the detector element and associated optical system which focuses a remote source of radiant energy on the element. Drive means consisting of servo drive motors connected to the carriage means or gimbal moves the tracker with 2° of freedom of movement. The detector element has four input terminals quadrilaterally arranged, and a centrally positioned sensing contact. Alternating current power sources are connected to orthogonally matched pairs of contacts for providing orthogonal voltage gradients through the element in phase quadrature. Output means are coupled to the element through the sensing contact to provide information to the servo drive motors indicative of the position of the remote source of radiant energy. Balancing means are coupled to the power sources and sensing contact to provide a null reference.

Referring now to FIG. 7, the photoconductive material 10 on support 11 is mechanically connected to a carriage means or gimbal 90 so as to function as a null seeking device with 2° of freedom. Reference and quadrature voltage gradients are established and balanced in the same manner as described for the circuit of FIG. 6. A distant source of radiant energy 31 is focussed by lens 32 to form a target image 12 on the surface of photoconductive material 10. Target image 12 is assumed to be displaced in the x- and y-directions from the null point at sensing contact 51. The displacement of target image 12 from the null point causes a signal with reference and quadrature components of voltage to be present at the output of amplifier 53. Instead of the output of amplifier 53 going into phase sensitive rectifiers as in FIG. 6, the output goes directly to drive means including windings 79 and 80 of gear-reduction servomotors 75 and 76. The other windings 81, 82 of motors 75, 76 are connected to the voltage sources 61, 62, respectively. Since servo motor 76 will rotate under the action of 90° out-of-phase voltages applied to windings 80 and 82, the zero phase signal from amplifier 53 appearing at winding 80 will react with the 90° phase voltage 62 on winding 82 to rotate gimbal shaft 91 in a direction to cause target image 12 to move in the x-direction across cell 10 so that target image 12 moves toward contact 51. At the same time, motor 75 has winding 81 excited by the zero phase voltage source 61 and winding 79 excited by output of amplifier 53 to cause motor 75 to rotate gimbal shaft 92 whereby the position of target image 12 moves toward contact 51. When the x and y coordinate positions of target images 12 and contact 51 are identical, no further signal output occurs from amplifier 53 and motors 75 and 76 cease to rotate. The azimuth and elevation angles through which photoconductive material 10 has moved to obtain a null is provided on indicators 93 and 94. Lens 32 is connected to support 11 by arm 74 and moves with support 11 on the gimbal 90 to keep source 31 focused as target image 12 on cell 10.

Devices using lead sulphide as the photoconductive material have been built and successfully operated. However, other materials possessing photoconductive properties may be used, such as lead selenide, lead telluride, indium antimonide, and gold doped germanium. Thermistor heat sensitive elements are also capable of being used. Certain of these materials may be more suitable than others because of their resistivity, change in resistivity with impinging radiation, and reduced drift in the null position with change in temperature. The lead sulphide cells 10 described in this specification were plated onto a quartz substrate support 11 in order to provide mechanical rigidity. Quartz, which is easily penetrated by infrared radiation, is an excellent support for the photoconductive material. Gold contacts 13, 14, 15, 16 and 51 were evaporated on the exposed surface of material 10 away from the source of radiation. Wires are connected to the gold contacts and extend at right angles from the surface to minimize the contact area. An epoxy compound is then applied to cover the lead sulphide surface area in order to provide mechanical strength for the contacts and detector material.

Since the sensitivity of the cell 10 is measured in terms of voltage output per unit of incident radiant energy, the greater the applied voltage the greater the sensitivity. The lead sulphide film 10 has a thickness such that the resistance between contacts 13, 14 and 15, 16 will allow a reasonable current to flow through the cell with the desired voltage applied to contacts 13, 14 and 15, 16. Typically, a thickness of 1 micron (resistance of 1 megohm) is satisfactory for a voltage 61, 62 of 110 volts rms applied to terminals 13, 14 and 15, 16. A thicker cell 10 will decrease resistance and hence increase power dissipation for a given applied voltage. A limit on the applied voltage and cell thickness is imposed by the heating effect and consequent noise increase of the cell.

Alternating current voltage sources 61 and 62 are not critical in terms of frequency. Frequencies from 100 cycles per second to 1800 cycles per second have been used. The high frequency limit appears to be much higher and limited by undesirable phase shift effects produced by leakage inductance and stray capacitance which must be balanced out. The voltage of sources 61, 62 is typically 110 volts at 400 cycles appearing across terminals 13, 14 and 15, 16.

The cell areas used in the apparatus of this specification were 0.4 inch square and 0.2 inch square although the dimensions are not critical. The contacts 13 through 16 are typically 0.040 inch in diameter with the sensing contact 51 having a diameter of 0.015 inch. The contacts 13 through 16 may be located at the extreme corners of the cell material, the center of each edge of the material, or inwardly spaced from the corner or edges toward the center of the material. The location of the contacts 13 through 16 determines the shape and spacing of the equipotential lines but is not critical.

The lines of maximum potential gradient between terminals 13, 14 and 15, 16 are orthogonal in the preferred embodiments of FIGS. 6 and 7. This orthogonality coupled with the 90° phase difference in voltages 61 and 62 results in d.c. outputs 68, 69 in FIG. 6 which are solely produced by the x and y displacement, respectively, of target image 12 from contact 51. If the maximum potential gradient lines intersect at an angle different from 90°, or if the phase difference in voltages 61 and 62 is other than 90°, the d.c. outputs 68, 69 will each contain contributions from the x and y displacement. In general, orthogonality in spacing of the pairs of contacts and in phase of applied voltages is preferred since circuit complexity is reduced thereby.

The preferred embodiments of the invention shown and described in this specification are illustrative only. Various modifications may be made therein without departing from the spirit and scope of this invention as set forth in the appended claims.

What is claimed is:

1. Radiant energy sensing apparatus comprising:
   a radiant energy responsive photoconductive element having a surface,
   a plurality of electrical contacts making electrical ohmic connection with said element in mutually spaced relation on said element,
   a plurality of out-of-phase sources of alternating current, each of said plurality of sources being simultaneously connected to and energizing a different pair of said contacts, said pairs of contacts being oriented along non-parallel lines in relation to each other,
   a sensing contact being one of said plurality of contacts, said sensing contact being disposed within the region bounded by the contacts of said pairs,
   an output terminal connected to said sensing contact to provide a plurality of out-of-phase continuous output signals of alternating current,
   means for separating said plurality of continuous output signals to provide a separate continuous output signal corresponding to each out-of-phase source, the phase and amplitude of each separate output signal relative its corresponding source being indicative of the position of impinging radiant energy on the surface of said element.

2. Radiant energy sensing apparatus comprising:
   a radiant energy responsive detector element including a support having a surface area and a layer of photoconductive material on the surface of said support, a plurality of electrical contacts making electrical ohmic connection with said photoconductive material in mutually spaced relation over said area including at least four contacts in mutually spaced quadrilateral configuration, one pair of said contacts being oriented along a line orthogonal to the other pair of said contacts, a plurality of sources of alternating current, each of said sources connected to a different pair of said contacts, said sources being out of phase and establishing simultaneous voltage gradients within said photoconductive material along orthogonally oriented lines, a sensing contact centrally disposed within said quadrilateral configuration in electrical ohmic contact with said photoconductive material, and output means electrically coupled to said centrally disposing sensing contact to provide a continuous electrical signal, means for sensing the phase and amplitude of said signal with respect to said out-of-phase sources, the in-phase amplitude and polarity of said signal with respect to each source being responsive to the position of impinging radiant energy on the surface of said element relative the terminals to which each source is connected.

3. Radiant energy sensing apparatus comprising:

a radiant energy responsive detector element including a support having a surface area and a layer of photoconductive material on the surface of said support, four electrical contacts making electrical ohmic connection with said photoconductive material in mutually spaced quadrilateral configuration, each pair of said contacts being located at opposite corners of said quadrilateral configuration, two sources of alternating current, each of said sources connected to a different pair of said contacts, said sources being in phase quadrature and establishing voltage gradients within said photoconductive material, a sensing contact centrally disposed within said quadrilateral configuration in electrical ohmic contact with said photoconductive material, and output means coupled to said centrally disposed sensing contact to provide a continuous signal indicative of the position of impinging radiant energy on the surface of said element, said output means including two phase sensitive rectifiers each having an input connected to said sensing contact, one of said rectifiers having one of said sources connected as its other input whereby said one rectifier provides a first continuous voltage output, the other of said rectifiers having the other of said sources connected at its other input whereby said other rectifier provides a second continuous voltage output.

4. Radiant energy sensing apparatus comprising:

a radiant energy responsive detector element including a support having a surface area and a layer of photoconductive material on the surface of said support, four electrical contacts making electrical ohmic connection with said photoconductive material in mutually spaced quadrilateral configuration, one pair of said contacts being oriented along a line orthogonal to the other pair of said contacts, two sources of alternating current, each of said sources connected to a different pair of said contacts, said sources being in phase quadrature and establishing voltage gradients within said photoconductive material along orthogonally oriented lines, a sensing contact centrally disposed within said quadrilateral configuration in ohmic electrical contact with said photoconductive material, and output means coupled to said centrally disposed sensing contact to provide a continuous signal indicative of the position of impinging radiant energy on the surface of said element, said output means including at least two phase-sensitive detectors each having an input connected to said sensing contact, one of said detectors having one of said sources of alternating current applied as another of its inputs, said one detector having an output voltage and phase indicative of said position relative the pair of contacts to which said one source is connected, the other of said detectors having the other of said sources of alternating current as another of its inputs, said other detector having an output voltage and phase indicative of said position relative the pair of contacts to which said other source is connected.

5. Radiant energy sensing apparatus comprising:

a radiant energy responsive detector element including a support having a surface area and a layer of photoconductive material on the surface of said support, said material having a plurality of electrical ohmic contacts, four of said contacts being arranged in a mutually spaced quadrilateral configuration, one pair of said four contacts being oriented along a line orthogonal to the other pair of said four contacts, a source of alternating current of reference phase having a push-pull balanced voltage output with respect to a ground connection of said source, said reference phase source output being connected to one pair of contacts, a source of alternating current of quadrature phase having a push-pull balanced voltage output with respect to a ground connection of said source, said quadrature phase source output being connected to the other pair of contacts, a sensing contact centrally disposed within said quadrilateral configuration making electrical ohmic connection with said material, and output means connected to said sensing contact to provide a continuous output signal relative to ground potential indicative of the position of impinging radiant energy on the surface of the element, said output means including at least two phase sensitive detectors having an input of each connected to said sensing contact, one of said detectors having said source of alternating current of reference phase applied as another input whereby said one detector output provides a continuous voltage output whose amplitude and polarity indicate the location of said impinging radiant energy relative to said one pair of contacts, the other of said detectors having said source of alternating current of quadrature phase applied as another input whereby said other detector output provides a continuous voltage output whose amplitude and polarity indicate the location of said impinging radiant energy relative to said other pair of contacts.

6. Target tracking apparatus comprising:

a radiant energy responsive detector element including a support having a surface area and a layer of photoconductive material on the surface of said support, carriage means on which said detector element is mounted, said carriage means being mounted for movement with two degrees of freedom, said material having a plurality of electrical contacts, four of said contacts being arranged in a mutually spaced quadrilateral configuration, one pair of said four contacts being oriented along a line orthogonal to the other pair of said four contacts, a source of alternating current of reference phase having a push-pull balanced voltage output with respect to a ground connection of said source, said reference phase source output being connected to one pair of contacts, a source of alternating current of quadrature phase having a push-pull balanced voltage output with respect to a ground connection of said source, said quadrature phase source output being connected to the other pair of contacts, a sensing contact centrally disposed within said quadrilateral configuration making electrical connection with said material, output means connected to said sensing contact to provide an output signal relative to ground potential indicative of the position of impinging radiant energy on the surface of the element, said output means including a phase sensitive drive means responsive to the reference and quadrature voltage components of said output signal, and said drive means adapted to move said carriage means in response to said output voltage components to a position where radiant energy impinging on said material from a remote source produces a zero output voltage.

7. Target tracking apparatus comprising:

a radiant energy responsive detector element including a support having a surface area and a layer of photoconductive material on the surface of said support, carriage means on which said detector element is mounted, said carriage means being mounted for movement with two degrees of freedom, said material having a plurality of electrical contacts, four of said contacts being arranged in a mutually spaced quadrilateral configuration, one pair of said four contacts being oriented along a line orthogonal to the other pair of said four contacts, a source of alternating current of reference phase having a push-pull balanced voltage output with respect to a ground connection of said source, said reference phase source output being connected to one pair of contacts, a source of alternating current of quadrature phase having a push-pull balanced voltage output with respect to a ground connection of said source, said quadrature phase source output being connected to the other pair of contacts, a sensing contact centrally disposed within said quadrilateral configuration making electrical connection with said material, output means connected to said sensing contact to provide an output signal relative to ground potential indicative of the position of impinging radiant energy on the surface of the element, said output means including a phase sensitive drive means responsive to the reference and quadrature voltage components of said output signal, said drive means adapted to move said carriage means in response to said output voltage components to a position where radiant energy impinging on said material from a remote source produces a zero output voltage, null balancing means connected to said output means to provide a zero output voltage in the absence of said impinging radiant energy, and said balancing means including means for introducing reference and quadrature voltages from said sources into said output means of phase and amplitude sufficient to cancel the residual output voltage from said sensing contact.

* * * * *